US009087653B2

(12) United States Patent
Henke

(10) Patent No.: US 9,087,653 B2
(45) **Date of Patent: *Jul. 21, 2015**

(54) TWO TERMINAL ARC SUPPRESSOR

(71) Applicant: ARC Suppression Technologies, LLC, Bloomington, MN (US)

(72) Inventor: Reinhold Henke, Plymouth, MN (US)

(73) Assignee: ARC Suppression Technologies, LLC, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,438

(22) Filed: Nov. 20, 2013

(65) Prior Publication Data

US 2014/0078623 A1 Mar. 20, 2014

Related U.S. Application Data

(63) Continuation of application No. 12/723,055, filed on Mar. 12, 2010, now Pat. No. 8,619,395.

(51) Int. Cl.
*H02H 3/00* (2006.01)
*H01H 9/30* (2006.01)
*H01H 9/54* (2006.01)

(52) U.S. Cl.
CPC *H01H 9/30* (2013.01); *H01H 9/542* (2013.01)

(58) Field of Classification Search
USPC .......................................................... 361/2
See application file for complete search history.

(56) References Cited

U.S. PATENT DOCUMENTS

| | | | |
|---|---|---|---|
| 1,368,325 | A | 2/1921 | Crichton |
| 2,011,395 | A | 8/1935 | Cain |
| 2,052,318 | A | 8/1936 | Siegmund |
| 2,356,166 | A | 8/1944 | Lee et al. |
| 2,467,937 | A | 4/1949 | Jackson |
| 2,476,843 | A | 7/1949 | Curtis |
| 2,608,607 | A | 8/1952 | Wharton et al. |
| 2,629,798 | A | 2/1953 | Salzer |

(Continued)

FOREIGN PATENT DOCUMENTS

| | | | |
|---|---|---|---|
| EP | 0521017 | A1 | 7/1993 |
| EP | 0550054 | A1 | 7/1993 |

(Continued)

OTHER PUBLICATIONS

U.S. Appl. No. 12/723,055 , Response filed Jul. 15, 2013 to Non Final Office Action mailed Mar. 15, 2013, 8 pgs.

(Continued)

*Primary Examiner* — Stephen W Jackson

(74) *Attorney, Agent, or Firm* — Schwegman Lundberg & Woessner, P.A.

(57) ABSTRACT

A two terminal arc suppressor for protecting switch, relay or contactor contacts and the like comprises a two terminal module adapted to be attached in parallel with the contacts to be protected and including a circuit for deriving an operating voltage upon the transitioning of the switch, relay or contactor contacts from a closed to an open disposition, the power being rectified and the resulting DC signal used to trigger a power triac switch via an optoisolator circuit whereby arc suppression pulses are generated for short predetermined intervals only at a transition of the mechanical switch, relay or contactor contacts from an closed to an open transition and, again, at an open to a close transition during contact bounce conditions.

20 Claims, 6 Drawing Sheets

(56) References Cited

U.S. PATENT DOCUMENTS

| | | | |
|---|---|---|---|
| 2,637,769 | A | 5/1953 | Walker |
| 2,705,766 | A | 4/1955 | Tung |
| 2,722,649 | A | 11/1955 | Immel et al. |
| 2,736,857 | A | 2/1956 | Klug |
| 2,768,264 | A | 10/1956 | Jones et al. |
| 2,782,345 | A | 2/1957 | Kesselring |
| 2,789,253 | A | 4/1957 | Vang |
| 2,802,149 | A | 8/1957 | Germer et al. |
| 2,845,580 | A | 7/1958 | Smith |
| 2,859,400 | A | 11/1958 | Kesselring |
| 2,873,419 | A | 2/1959 | Brandt |
| 2,958,808 | A | 11/1960 | Miller |
| 2,970,196 | A | 1/1961 | Reagan |
| 3,075,124 | A | 1/1963 | Bagno |
| 3,152,282 | A | 10/1964 | Baltensperger et al. |
| 3,184,619 | A | 5/1965 | Zydney |
| 3,223,888 | A | 12/1965 | Koppelmann |
| 3,237,030 | A | 2/1966 | Coburn |
| 3,260,894 | A | 7/1966 | Denault |
| 3,264,519 | A | 8/1966 | Minck |
| 3,278,801 | A | 10/1966 | Chauvineau |
| 3,309,570 | A | 3/1967 | Goldberg |
| 3,321,668 | A | 5/1967 | Baker |
| 3,324,271 | A | 6/1967 | Schuck et al. |
| 3,330,992 | A | 7/1967 | Perrins |
| 3,339,110 | A | 8/1967 | Jones, Jr. |
| 3,372,303 | A | 3/1968 | Knott |
| 3,389,301 | A | 6/1968 | Siwko |
| 3,395,316 | A | 7/1968 | Denes et al. |
| 3,401,303 | A | 9/1968 | Walker |
| 3,402,302 | A | 9/1968 | Coburn |
| 3,412,288 | A | 11/1968 | Ostrander |
| 3,430,016 | A | 2/1969 | Hurtle |
| 3,430,063 | A | 2/1969 | Webb |
| 3,431,466 | A | 3/1969 | Watanabe et al. |
| 3,466,503 | A | 9/1969 | Goldberg |
| 3,474,293 | A | 10/1969 | Siwko et al. |
| 3,491,284 | A | 1/1970 | Pascente |
| 3,504,233 | A | 3/1970 | Hurtle |
| 3,513,274 | A | 5/1970 | Jullien-davin |
| 3,529,210 | A | 9/1970 | Ito et al. |
| 3,539,775 | A | 11/1970 | Casson |
| 3,543,047 | A | 11/1970 | Renfrew |
| 3,555,353 | A | 1/1971 | Casson |
| 3,558,910 | A | 1/1971 | Dale et al. |
| 3,558,977 | A | 1/1971 | Beaudoin |
| 3,562,584 | A | 2/1971 | Yoshimura |
| 3,588,605 | A | 6/1971 | Casson |
| 3,596,026 | A | 7/1971 | Rys |
| 3,614,464 | A | 10/1971 | Chumakov |
| 3,633,069 | A | 1/1972 | Bernard et al. |
| 3,639,808 | A | 2/1972 | Ritzow |
| 3,644,755 | A | 2/1972 | Shaw |
| 3,648,075 | A | 3/1972 | Mankovitz |
| 3,673,436 | A | 6/1972 | Adams, Jr. |
| 3,708,718 | A | 1/1973 | Hoffmann et al. |
| 3,711,668 | A | 1/1973 | Harnden, Jr. |
| 3,731,149 | A | 5/1973 | Sherman et al. |
| 3,739,192 | A | 6/1973 | Oswald |
| 3,743,860 | A | 7/1973 | Rossell |
| 3,783,305 | A | 1/1974 | Lefferts |
| 3,801,832 | A | 4/1974 | Joyce |
| 3,818,311 | A | 6/1974 | Mattson et al. |
| 3,828,263 | A | 8/1974 | Blomenkamp |
| 3,868,549 | A | 2/1975 | Schaefer et al. |
| 3,870,905 | A | 3/1975 | Chikazawa |
| 3,883,782 | A | 5/1975 | Beckwith |
| 3,889,131 | A | 6/1975 | Speller |
| 3,940,634 | A | 2/1976 | Grogan |
| 3,982,137 | A | 9/1976 | Penrod |
| 4,025,820 | A | 5/1977 | Penrod |
| 4,041,331 | A | 8/1977 | Westerman et al. |
| 4,056,836 | A | 11/1977 | Knauer |
| 4,068,273 | A | 1/1978 | Metzler |
| 4,074,098 | A | 2/1978 | Pullen |
| 4,074,333 | A | 2/1978 | Murakami et al. |
| 4,110,806 | A | 8/1978 | Murano et al. |
| 4,152,634 | A | 5/1979 | Penrod |
| 4,172,268 | A | 10/1979 | Yanabu et al. |
| 4,216,513 | A | 8/1980 | Tokuyama et al. |
| 4,225,895 | A | 9/1980 | Hjertman |
| 4,246,621 | A | 1/1981 | Tsukioka |
| 4,249,223 | A | 2/1981 | Shuey et al. |
| 4,250,531 | A | 2/1981 | Ahrens |
| 4,251,845 | A | 2/1981 | Hancock |
| 4,289,941 | A | 9/1981 | Cannon |
| 4,296,331 | A | 10/1981 | Rodriguez |
| 4,296,449 | A | 10/1981 | Eichelberger |
| 4,349,748 | A | 9/1982 | Goldstein et al. |
| 4,351,014 | A | 9/1982 | Schofield, Jr. |
| 4,356,525 | A | 10/1982 | Kornrumpf et al. |
| 4,360,847 | A | 11/1982 | Bloomer et al. |
| 4,370,564 | A | 1/1983 | Matsushita |
| 4,375,021 | A | 2/1983 | Pardini et al. |
| 4,389,691 | A | 6/1983 | Hancock |
| 4,392,171 | A | 7/1983 | Kornrumpf |
| 4,393,287 | A | 7/1983 | Nakano |
| 4,405,904 | A | 9/1983 | Oida et al. |
| 4,420,784 | A | 12/1983 | Chen et al. |
| 4,429,339 | A | 1/1984 | Jaeschke et al. |
| 4,438,472 | A | 3/1984 | Woodworth |
| 4,445,183 | A | 4/1984 | McCollum et al. |
| 4,446,347 | A | 5/1984 | Eguchi et al. |
| 4,466,038 | A | 8/1984 | Robertson |
| 4,500,934 | A | 2/1985 | Kinsinger |
| 4,503,302 | A | 3/1985 | Chrisp |
| 4,525,762 | A | 6/1985 | Norris |
| 4,536,814 | A | 8/1985 | Theisen et al. |
| 4,564,768 | A | 1/1986 | Komiya et al. |
| 4,583,146 | A | 4/1986 | Howell |
| 4,598,330 | A | 7/1986 | Woodworth |
| 4,613,801 | A | 9/1986 | Tatom, Jr. |
| 4,618,906 | A | 10/1986 | Paice et al. |
| 4,631,621 | A | 12/1986 | Howell |
| 4,631,627 | A | 12/1986 | Morgan |
| 4,636,906 | A | 1/1987 | Anderson et al. |
| 4,636,907 | A | 1/1987 | Howell |
| 4,642,481 | A | 2/1987 | Bielinski et al. |
| 4,644,309 | A | 2/1987 | Howell |
| 4,652,962 | A | 3/1987 | Howell |
| 4,658,320 | A | 4/1987 | Hongel |
| 4,685,019 | A | 8/1987 | Needham |
| 4,700,256 | A | 10/1987 | Howell |
| 4,704,652 | A | 11/1987 | Billings |
| 4,723,187 | A | 2/1988 | Howell |
| 4,725,911 | A | 2/1988 | Dieppedalle et al. |
| 4,740,858 | A | 4/1988 | Yamaguchi et al. |
| 4,745,511 | A | 5/1988 | Kugelman et al. |
| 4,752,659 | A | 6/1988 | Spooner |
| 4,754,360 | A | 6/1988 | Nakada |
| 4,760,483 | A | 7/1988 | Kugelman et al. |
| 4,767,944 | A | 8/1988 | Takeuchi et al. |
| 4,772,809 | A | 9/1988 | Koga et al. |
| 4,802,051 | A | 1/1989 | Kim |
| 4,811,163 | A | 3/1989 | Fletcher |
| 4,816,818 | A | 3/1989 | Roller |
| 4,831,487 | A | 5/1989 | Ruoss |
| 4,855,612 | A | 8/1989 | Koga et al. |
| 4,864,157 | A | 9/1989 | Dickey |
| 4,885,654 | A | 12/1989 | Budyko et al. |
| 4,922,363 | A | 5/1990 | Long |
| 4,937,703 | A | 6/1990 | Adams |
| 4,939,776 | A | 7/1990 | Bender |
| 4,959,746 | A | 9/1990 | Hongel |
| 4,980,528 | A | 12/1990 | Spooner |
| 4,992,904 | A | 2/1991 | Spencer et al. |
| 5,053,907 | A | 10/1991 | Nishi et al. |
| 5,079,457 | A | 1/1992 | Lu |
| 5,081,558 | A | 1/1992 | Mahler |
| 5,138,177 | A | 8/1992 | Morgan et al. |
| 5,151,840 | A | 9/1992 | Siefken |
| 5,162,682 | A | 11/1992 | Lu |
| 5,164,872 | A | 11/1992 | Howell |
| 5,192,894 | A | 3/1993 | Teschner |

(56) References Cited

U.S. PATENT DOCUMENTS

| | | | |
|---|---|---|---|
| 5,214,557 | A | 5/1993 | Hasegawa et al. |
| 5,216,303 | A | 6/1993 | Lu |
| 5,241,152 | A | 8/1993 | Anderson et al. |
| 5,242,611 | A | 9/1993 | Griffaw |
| 5,247,418 | A | 9/1993 | Augo |
| 5,281,321 | A | 1/1994 | Sturmer et al. |
| 5,283,706 | A | 2/1994 | Lillemo et al. |
| 5,309,068 | A | 5/1994 | Hakkarainen et al. |
| 5,402,297 | A | 3/1995 | Ouchi et al. |
| 5,406,442 | A | 4/1995 | Kristensen |
| 5,412,526 | A | 5/1995 | Kapp et al. |
| 5,430,419 | A | 7/1995 | Scheel et al. |
| 5,436,786 | A | 7/1995 | Pelly |
| 5,449,988 | A | 9/1995 | Gurstein et al. |
| 5,452,170 | A | 9/1995 | Ohde et al. |
| 5,463,199 | A | 10/1995 | Divincenzo et al. |
| 5,463,252 | A | 10/1995 | Jones et al. |
| 5,479,075 | A | 12/1995 | Chen |
| 5,488,535 | A | 1/1996 | Masghati et al. |
| 5,489,840 | A | 2/1996 | Caron |
| 5,517,378 | A | 5/1996 | Asplund et al. |
| 5,519,370 | A | 5/1996 | Perreira et al. |
| 5,528,443 | A | 6/1996 | Itoga et al. |
| 5,530,615 | A | 6/1996 | Miller et al. |
| 5,536,980 | A | 7/1996 | Kawate et al. |
| 5,548,461 | A | 8/1996 | James |
| 5,563,459 | A | 10/1996 | Kurosawa et al. |
| 5,570,262 | A | 10/1996 | Doerwald |
| 5,576,919 | A | 11/1996 | Wilkens |
| 5,578,980 | A | 11/1996 | Okubo et al. |
| 5,589,753 | A | 12/1996 | Kadah et al. |
| 5,598,311 | A | 1/1997 | Yang |
| 5,604,656 | A | 2/1997 | Derrick et al. |
| 5,629,824 | A | 5/1997 | Rankin et al. |
| 5,633,540 | A | 5/1997 | Moan |
| 5,640,113 | A | 6/1997 | Hu |
| 5,652,688 | A | 7/1997 | Lee |
| 5,666,257 | A | 9/1997 | Yang |
| 5,699,218 | A | 12/1997 | Kadah |
| 5,703,743 | A | 12/1997 | Lee |
| 5,737,172 | A | 4/1998 | Ohtsuka |
| 5,764,459 | A | 6/1998 | Yang |
| 5,790,354 | A | 8/1998 | Altiti et al. |
| 5,793,589 | A | 8/1998 | Friedl |
| 5,804,991 | A | 9/1998 | Hu |
| 5,818,710 | A | 10/1998 | LeVan Suu |
| 5,923,513 | A | 7/1999 | Pelly |
| 5,933,304 | A | 8/1999 | Irissou |
| 5,953,189 | A | 9/1999 | Abot et al. |
| 6,046,899 | A | 4/2000 | Dougherty |
| 6,052,402 | A | 4/2000 | Murray et al. |
| 6,078,491 | A | 6/2000 | Kern et al. |
| 6,091,166 | A | 7/2000 | Olsen et al. |
| 6,140,715 | A | 10/2000 | Bernhoff et al. |
| 6,249,417 | B1 | 6/2001 | Pippen |
| 6,265,703 | B1 | 7/2001 | Alton et al. |
| 6,291,909 | B1 | 9/2001 | Olsen |
| 6,347,024 | B1 | 2/2002 | Blain et al. |
| 6,491,532 | B1 | 12/2002 | Schoepf et al. |
| 6,537,092 | B2 | 3/2003 | Hirai et al. |
| 6,577,479 | B1 | 6/2003 | Springer |
| 6,603,221 | B1 | 8/2003 | Liu |
| 6,618,235 | B1 | 9/2003 | Wagoner et al. |
| 6,621,668 | B1 | 9/2003 | Sare |
| 6,624,989 | B2 | 9/2003 | Brooks, Jr. |
| 6,643,112 | B1 | 11/2003 | Carton et al. |
| 6,654,260 | B2 | 11/2003 | Okayama et al. |
| 6,671,142 | B2 | 12/2003 | Beckert et al. |
| 6,683,766 | B1 | 1/2004 | Guo et al. |
| 6,687,100 | B1 | 2/2004 | Rice et al. |
| 6,690,098 | B1 | 2/2004 | Saldana |
| 6,703,575 | B1 | 3/2004 | Yamamoto |
| 6,707,171 | B1 | 3/2004 | Huenner et al. |
| 6,707,358 | B1 | 3/2004 | Massman |
| 6,741,435 | B1 | 5/2004 | Cleveland |
| 6,760,610 | B2 | 7/2004 | Tschupp et al. |
| 6,797,909 | B2 | 9/2004 | Pride et al. |
| 6,860,746 | B2 | 3/2005 | Ota et al. |
| 6,885,535 | B2 | 4/2005 | Hummert et al. |
| 6,891,705 | B2 | 5/2005 | Bryan |
| 6,917,500 | B2 | 7/2005 | Vail et al. |
| 6,956,725 | B2 | 10/2005 | Boughton, Jr. et al. |
| 6,969,927 | B1 | 11/2005 | Lee |
| 7,023,683 | B1 | 4/2006 | Guo et al. |
| 7,061,252 | B2 | 6/2006 | Bouton et al. |
| 7,079,363 | B2 | 7/2006 | Chung |
| 7,110,225 | B1 | 9/2006 | Hick |
| 7,145,758 | B2 | 12/2006 | King et al. |
| 7,161,306 | B2 | 1/2007 | Ravindra et al. |
| 7,259,945 | B2 | 8/2007 | Cleveland |
| 7,262,942 | B2 | 8/2007 | Lam |
| 7,292,045 | B2 | 11/2007 | Anwar et al. |
| 7,339,288 | B2 | 3/2008 | Schasfoort |
| 7,342,754 | B2 | 3/2008 | Fitzgerald et al. |
| 7,385,791 | B2 | 6/2008 | Ness |
| 7,416,573 | B2 | 8/2008 | Lindgren et al. |
| 7,463,460 | B2 | 12/2008 | Haines |
| 7,505,236 | B2 | 3/2009 | Kobielski |
| 7,514,936 | B2 | 4/2009 | Anwar et al. |
| 7,538,990 | B2 | 5/2009 | Belisle et al. |
| 7,554,222 | B2 | 6/2009 | Kumfer et al. |
| 7,561,430 | B2 | 7/2009 | Tiedemann et al. |
| 7,612,471 | B2 | 11/2009 | Schasfoort |
| 7,643,256 | B2 | 1/2010 | Wright et al. |
| 7,660,083 | B2 | 2/2010 | Yao et al. |
| 7,697,247 | B2 | 4/2010 | Maharsi et al. |
| 7,782,578 | B2 | 8/2010 | Tao |
| 7,929,261 | B2 | 4/2011 | Wiedemuth |
| 7,961,443 | B2 | 6/2011 | Pfingsten et al. |
| 8,033,246 | B2 | 10/2011 | Wiedemuth |
| 8,050,000 | B2 | 11/2011 | Wright et al. |
| 8,619,395 | B2 | 12/2013 | Henke |
| 2002/0039268 | A1 | 4/2002 | Bryan et al. |
| 2002/0106921 | A1 | 8/2002 | Hirai et al. |
| 2002/0171983 | A1 | 11/2002 | Brooks, Jr. |
| 2003/0003788 | A1 | 1/2003 | Schoepf et al. |
| 2003/0184926 | A1 | 10/2003 | Wu et al. |
| 2003/0193770 | A1 | 10/2003 | Chung |
| 2004/0027734 | A1 | 2/2004 | Fairfax et al. |
| 2004/0052011 | A1 | 3/2004 | King |
| 2004/0052012 | A1 | 3/2004 | Boughton et al. |
| 2004/0095091 | A1 | 5/2004 | McNulty et al. |
| 2004/0165322 | A1 | 8/2004 | Crawford et al. |
| 2004/0179313 | A1 | 9/2004 | Cleveland |
| 2005/0007715 | A1 | 1/2005 | Mukai et al. |
| 2005/0157443 | A1 | 7/2005 | Bryan et al. |
| 2005/0270716 | A1 | 12/2005 | Nakano |
| 2006/0001433 | A1 | 1/2006 | Bouton et al. |
| 2006/0049831 | A1 | 3/2006 | Anwar et al. |
| 2006/0061920 | A1 | 3/2006 | Chun Lam |
| 2006/0087244 | A1 | 4/2006 | Regan |
| 2007/0014055 | A1 | 1/2007 | Ness |
| 2007/0024264 | A1 | 2/2007 | Lestician |
| 2007/0046233 | A1 | 3/2007 | Kobielski |
| 2007/0139829 | A1 | 6/2007 | Arthur et al. |
| 2007/0139831 | A1 | 6/2007 | Wright et al. |
| 2007/0217092 | A1 | 9/2007 | Tao |
| 2008/0061037 | A1 | 3/2008 | Asokan et al. |
| 2008/0112097 | A1 | 5/2008 | Maharsi et al. |
| 2008/0164961 | A1 | 7/2008 | Premerlani et al. |
| 2008/0192389 | A1 | 8/2008 | Muench et al. |
| 2008/0216745 | A1 | 9/2008 | Wiedemuth et al. |
| 2008/0218923 | A1 | 9/2008 | Wiedemuth |
| 2008/0250171 | A1 | 10/2008 | Pfingsten et al. |
| 2008/0258556 | A1 | 10/2008 | Ewing et al. |
| 2008/0266742 | A1 | 10/2008 | Henke et al. |
| 2008/0308394 | A1 | 12/2008 | Premerlani et al. |
| 2009/0168273 | A1 | 7/2009 | Yu et al. |
| 2009/0201617 | A1 | 8/2009 | Yamaguchi |
| 2010/0134931 | A1 | 6/2010 | Orozco |
| 2010/0213184 | A1 | 8/2010 | Harris |
| 2011/0122663 | A1 | 5/2011 | Huang |

(56) References Cited

U.S. PATENT DOCUMENTS

| | | | |
|---|---|---|---|
| 2011/0222191 | A1 | 9/2011 | Henke |
| 2012/0013200 | A1 | 1/2012 | Kroeker et al. |
| 2012/0113550 | A1 | 5/2012 | Anand et al. |

FOREIGN PATENT DOCUMENTS

| | | | |
|---|---|---|---|
| EP | 0703595 | A1 | 3/1996 |
| EP | 0810618 | A1 | 12/1997 |
| EP | 1170762 | A2 | 1/2002 |
| EP | 1209772 | A2 | 5/2002 |
| EP | 1229609 | A1 | 8/2002 |
| EP | 1714321 | A2 | 10/2006 |
| EP | 1928005 | A2 | 6/2008 |
| EP | 2162897 | A0 | 12/2008 |
| WO | WO-9519631 | A1 | 7/1995 |
| WO | WO-2005074094 | A1 | 8/2005 |
| WO | WO-2006014377 | A2 | 2/2006 |
| WO | WO-2007011692 | A1 | 1/2007 |
| WO | WO-2008153574 | A1 | 12/2008 |
| WO | WO-2008153960 | A1 | 12/2008 |
| WO | WO-2011112564 | A1 | 9/2011 |

OTHER PUBLICATIONS

U.S. Appl. No. 12/723,055, Final Office Action mailed Nov. 9, 2012, 5 pgs.

U.S. Appl. No. 12/723,055, Non Final Office Action mailed Mar. 15, 2013, 5 pgs.

U.S. Appl. No. 12/723,055, Non Final Office Action mailed Jun. 18, 2012, 5 pgs.

U.S. Appl. No. 12/723,055, Notice of Allowance mailed Jan. 23, 2013, 5 pgs.

U.S. Appl. No. 12/723,055, Notice of Allowance mailed Aug. 20, 2013, 6 pgs.

U.S. Appl. No. 12/723,055, Response filed Jan. 9, 2013 to Final Office Action mailed Nov. 9, 2012, 7 pgs.

U.S. Appl. No. 12/723,055, Response filed Sep. 18, 2012 to Non Final Office Action mailed Jun. 18, 2012, 8 pgs.

Application Serial No. PCT/US2011/027519 International Preliminary Report on Patentability mailed Sep. 27, 2012, 12 pgs.

International Application Serial No. PCT/US2011/027519, International Search Report mailed May 6, 2011, 3 pgs.

TWO TERMINAL ARC SUPPRESSOR

RELATED APPLICATION

This Application is a Continuation Application of, and claims the priority of U.S. patent application Ser. No. 12/723,055, filed Mar. 12, 2010, which is incorporated by reference in its entirety.

TECHNICAL FIELD

This invention relates generally to the field of arc suppressors and more specifically to the area of two terminal arc suppressors used to prevent the contact points of switches, relays or contactors from suffering premature failures due to the deleterious effects of contact current arcing during the contact closed to contact open transition and during the contact open to contact closed transitions. More particularly, the present invention relates to a device for extending contact life without requiring any external control wires, power wires or any other wires other than the two contact terminal wires that are used to connect the arc suppressor invention to the two contact points between which the arc is to be suppressed.

BACKGROUND

Every time an electrical heater, lamp or motor is turned on or off, using a single or multiphase switch, relay or contactor, an electrical arc occurs between the two contact points where the single or multiphase power connects to the load. The instantaneous energy contained in the resulting arc is very high (thousands of degrees Fahrenheit). This heat causes the metal molecules in the contact points to travel from the warmer point to the colder point. This metal migration pits out and destroys the contact surfaces over time, eventually leading to equipment failure.

This type of contact failure results in increased maintenance costs, unnecessary down time on production lines, higher frequency of product failures and many other issues that cost companies time, money and reputations. Current solutions in use today address contact arcing with modestly effective devices, including Solid State Relays (SSR's), Hybrid Power Relays (HPR's) which are custom-designed and expensive, and RC snubber circuits, which barely mitigate the problem.

Contact current arc suppression technology is either expensive and short-lived or durable, but risky at the product's end-of-life.

Environmental and health concerns, over the years, have lead to the replacement of highly durable mercury displacement relays (MDR) with electromechanical relays and contactors, leaving both industry and products vulnerable to the negative effects of contact arcing.

There are various undesirable effects of using the current technology, namely, environmental risks associated with disposal, high costs of replacement, and catastrophic end-of-life that needs to be proactively mitigated. Efforts are being made to reduce or eliminate these undesirable behaviors.

Arc Suppressors generally attach across the contact and/or coil terminals of a switch, relay or contactor and require some kind of external power connection or require power from the coil connection.

The two terminal arc suppressor of the present invention extends product life of contacts used today in industry, by many orders of magnitude, typically in excess of 500 times. Its product architecture makes it a generic, low-cost component solution that fits easily into new or existing product design and can be scaled to any type of switch, relay or contactor.

The use of the arc suppressor of the present invention results in increased machinery up-time and dramatic improvements in overall system reliability. It extends switch, relay or contactor life in excess of 500 times, thus resulting in reduced maintenance, repair and replacement costs.

Standard switches, relays or contactors are durable and potentially viable for use for up to 10,000,000 cycles when no load current is flowing. However, these same switches, relays or contactors decay more rapidly when carrying a load current. Their electrical life expectancy is reduced to a fraction of their mechanical life, typically down to 10,000 cycles or less. By comparison, without being subjected to electric currents, standard switches, relays or contactors are as durable as MDR's or SSR's. However, when subjected to electric current, the durability and reliability of these same standard switches, relays or contactors are far lower than environmentally objectionable MDR's unless arc suppressor technology offered by the present invention is added to the configuration.

The inevitable end-of-life (EOL) event for any switch, relay or contactor is failure. Standard switches, relays or contactors either fail closed, open or somewhere in between. But, the EOL failure mode of an MDR is typically catastrophic, with an explosion of its mercury-filled contact chamber and the release of highly toxic mercury vapors into its operating environment. Needless to say, this type of failure is especially undesirable when the MDR is operating in equipment that is used to process or prepare food. To mitigate risk, safety dictates proactive early replacement of these MDR's. The law requires proper disposal of these MDR's, a step often overlooked, to the detriment of the environment. Due to ignorance, equipment containing MDR's is typically buried in landfills that may be close to populated communities.

Industrial and commercial fryers, dryers, heaters, cookers, steamers, rollers, burners, ovens, slicers, dicers, coolers, fridges, freezers commonly utilize MDR's in the food processing industry. Thus, there is a need for arc suppressor fortified standard switches, relays or contactors so that the mercury-based devices can be eliminated.

Another important dimension of generic switch technology is the use of two components, namely, the relay or contactor coil and its associated contact that may fail occasionally. This is because these components operate in an asynchronous mode. Coil activation generally results in contact closure or opening and this action deploys in a time scale measured in milliseconds. However, coil deactivation may not be as responsive in opening the contact in the same time frame. This is due to micro-welding effects of the pitted-out contact surface landscape. The contact spring force is, sometimes, not strong enough to achieve the separation because of this micro-welding effect. In fact, this issue is accounted for in the relay and contactor manufacturing industry. A less-than-one-second delay in coil deactivation response is not considered a failure. This type of contact failure is reason enough to invalidate the use of the energization status of the relay or contactor coil to assume existence of a suppressible arc in any contact arc suppression solution.

The arc suppressor of the present invention only uses two wires to monitor the contact status and suppress the contact current arc, at the very instant that the contacts transition either from the open-to-close state, or, from the close-to-open state. In doing so, the arc suppressor of the current invention also bridges the gap between the electrical life and the mechanical life of standard switches, relays or contactors. It enables these lower-cost, lower-risk and green standard switches, relays or contactors to achieve the equivalent durability and reliability of MDR's and SSR's.

The arc suppressor of the present invention extends the inevitable EOL of a standard switch, relay or contactor by a factor in excess of 500 times. The arc suppressor to be described herein enables innately environmentally-friendly, low cost, designed standard switches, relays or contactors to be used in applications that these devices could historically not be applied to. Where the industry-standard arc solution was the durable but highly-toxic MDR's or expensive and inefficient, but nontoxic SSR's and HPR's, it can now be standard switches, relays or contactors fortified by a two terminal arc suppressor of the present invention.

Other advantages of the arc suppressor of the present invention include: Two wires only, no cooling required, no need for an external power supply, no neutral connection is required to feed its power supply, it monitors contact status, it suppresses an arc when it occurs and it is only turned on for the duration of one-half period which substantially reduces the fire hazard stemming from having the arc suppressing semiconductor turned on all the time during the contact closed state. When switches, relays or contactors fail, serious fire hazard conditions are often present.

There is a general assumption in the prior art that the coil and contact of a relay or contactor are a somewhat rigidly connected structure which response uniformly to cause and effect. This is not the case. The relay or contactor coil, which in turn activates the relay or contactor contact, is operating in an asynchronous mode. Simply expressed, they appear to not be related to each other, at least on an electronic level. When the coil is being energized by the application of a current through the two associated electromagnetic coil wires and thus forced to a change states from the non-magnetized state to the magnetized state, the relay or contactor contact will not timely respond with a corresponding change in state. In most relay or contactors, there is no guaranteed instance of simultaneity between a relay or contactor coil energization and its associated contact activation. The relationship between a relay or contactor coil and a contact is magnetic and mechanical. Because of the magnetic/mechanical connection, there is a great deal of resulting time lags between the relay or contactor coil change of state and the relay or contactor contact change of state. The time delays between the coil state changes and the contact state changes differ significantly from relay or contactor state-to-relay or contactor state, from time-to-time, from environment-to-environment, from device-to-device, from manufacturer-to-manufacturer, from changes in contact operating current, contact operating voltage and coil operating voltage.

Arcing and resulting micro-welding occur even with most prior art arc suppression approaches.

The only element that determines arc suppression timing is the contact and not the energizing coil of a relay or contactor. Thus the ideal arc suppressor should only require 2 wires for operation, not three, four or more.

Those skilled in the arc recognize that arcing only occurs when the contact transitions from the closed state (make) to the open (break) state. This includes contact bouncing during the transition to the on-state. The arc suppression element in the present invention is only active for not more than 10 ms during the contact transitions. Arc suppression timing is determined by the opening or closing of the contact only. As earlier indicated, arc suppression timing does not depend on the status of the relay or contactor coil.

Appropriate, i.e., timely arc suppression offered by the present invention minimizes thermal and mechanical stresses on the arc suppressor components and thus mitigates the need for cooling. It also minimizes thermal and mechanical stresses on the switch, relay or contactor components and thus mitigates the need for venting. Further, it minimizes the effects of metal migration.

Full arc suppression of mechanical switches, relays or contacts with current state-of-the-art technology is not achievable for mechanical contacts.

Arc suppression is only required for mechanical contacts such as the ones on switches, relays and contactors. It is not required for solid state switches or hybrid power relays; however, those devices are expensive and not universal.

An arc suppressor whose arc suppression element is "always on" during the closed contact state is dangerous. They must be inherently safe and, if not designed correctly, the arc suppressor becomes a fire hazard and a liability.

Arc suppressors of the prior art with three or more wires are neither optimal nor inherently safe because they rely on coil and power to decide when to suppress the arc.

Arc suppressors suppress the arcs generated during switch, relay or contactor transitions when switching lamps, heaters, motors and similar electric loads. Such loads are referred to as resistive, inductive and capacitive loads.

Contact stick times due to the effect of micro-welding of 200 ms are common. Even contact stick times of up to 999 ms are deemed acceptable by relay and contactor manufacturers.

Metal migration is the movement of metal alloy material from one contact surface to another. Metal molecules move from the warmer contact point (usually the moving one) to the colder contact point (usually the static one) as the heat of the arc melts the contact alloy material. This micro welding occurs with each contact made under power and increases as the contact surface deteriorates. Only the spring loaded contact armature strength breaks the micro welded contact connection.

Microwelding is due to the arcing that occurs during the transition from contact open to contact close occurring in high current density areas of the contact surface. This effect is also amplified by contact bounce during the transition from the open to the close contact state. The strength of the microweld connection greatly depends on the switch contact surface condition and the strength of the contact arc welding power.

SUMMARY OF THE INVENTION

The present invention provides an arc suppressor for switch contacts coupling a voltage source to a load where the arc suppressor comprises a pair of terminals adapted to be connected across a set of switch, relay or contactor contacts to be protected and where a solid state triggerable switch is connected between the pair of terminals. A triggering circuit is operatively coupled to the solid state triggerable switch and operative when the switch contacts move from a closed state to an open for driving the solid state triggerable switch into a conductive state to short out the switch contacts and further including a pinch-off circuit that is coupled to the triggering circuit for controlling the length of time that the solid state triggerable switch remains in its conductive state following movement of the switch contacts from the closed state to the open state.

Embodiments are disclosed for use when the power source feeding the load through the switch contacts is alternating current and direct current.

While the present disclosure is directed toward suppression of contact current arcs, further areas of applicability will become apparent from the description provided herein. It should be understood that the description and specific examples are intended for purposes of illustration only and are not intended to limit the scope of the present disclosure.

DESCRIPTION OF THE DRAWINGS

The forgoing features, objects and advantages of the invention will become apparent to those skilled in the art from the following detailed description, especially when considered in conjunction with the accompanying drawings in which like the numerals in the several views refer to the corresponding parts.

DETAILED DESCRIPTION

The following detailed description relates to a two terminal arc suppressor directed toward extending the life of switches, relays and contactors used to switch either an alternating current (AC) or a direct current (DC) source to a load.

The following detailed description includes discussion of a two terminal arc suppressor connected to a mechanical switch, relay or contactor. Additionally, elements of a two terminal arc suppressor discussed including a contact power harvester, a pinch-off circuit, a triggering circuit, a solid state triggerable switch, an RC snubber circuit, contact lead terminals, a voltage surge limiter and a timing diagram is included.

The present invention can be readily understood from a discussion of FIGS. 1 through 6.

Figure 1:
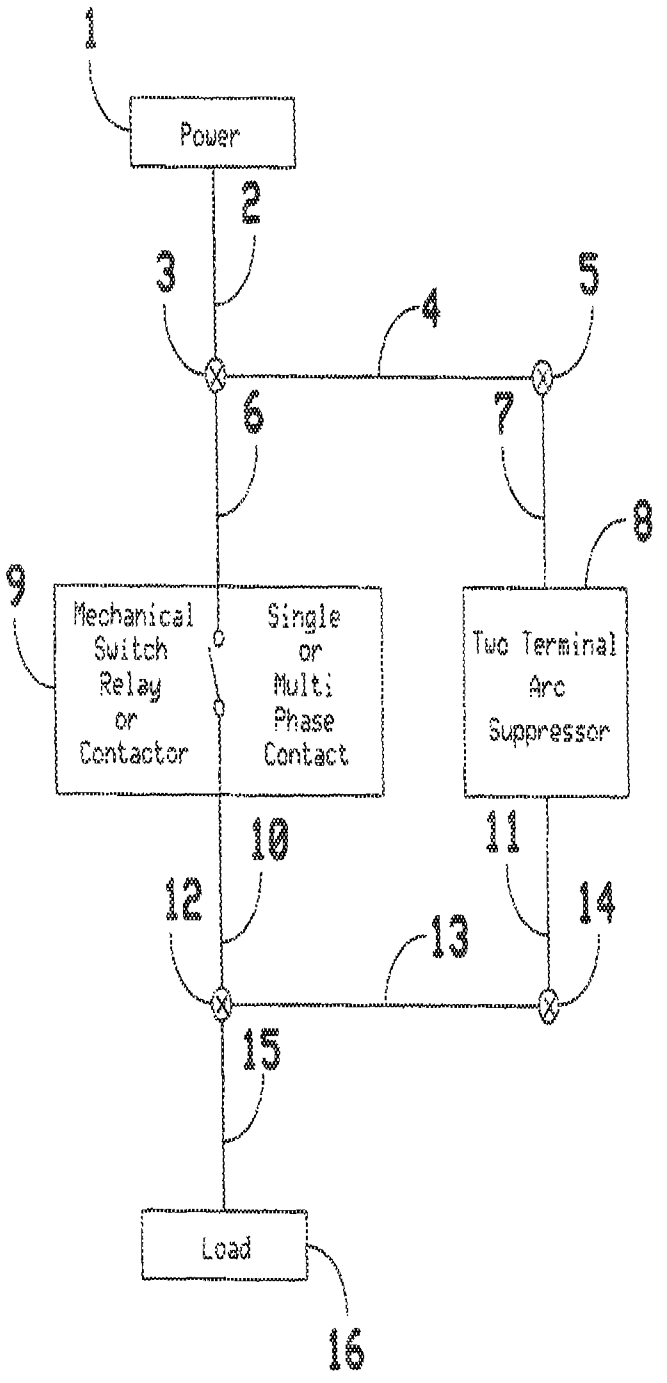
FIG. 1 is a block diagram illustrating the manner in which an arc suppressor in accordance with this invention is connected in circuit with contacts to be protected.

FIG. 1 illustrates generally an example of a system including a two terminal arc suppressor 8. In an example, an AC or a DC power source 1 is connected via wire 2 to the terminal 3 of a mechanical switch, relay or contactor contact for further connection to the mechanical switch, relay or contactor wiring 6 to the mechanical switch, relay or contactor 9. A load 16 is connected, via wire 15, to the second terminal 12 of the mechanical switch, relay or contactor for further connection, via the internal mechanical switch, relay or contactor wiring 10, to the mechanical switch, relay or contactor 9. A first wiring terminal 5 of the two terminal arc suppressor 8 comprising the present invention is connected to the mechanical switch, relay or contactor terminal 3 via its internal wiring 7, and its wire terminal 5 and through an external wire 4. The second wiring terminal 14 of the two terminal arc suppressor 8 is connected to the mechanical switch, relay or contactor terminal 12 via its internal wiring 11, its wire terminal 14 and through an external wire 13. Thus, the arc suppressor 8 is connected directly in parallel with the contacts to be protected.

Figure 2:
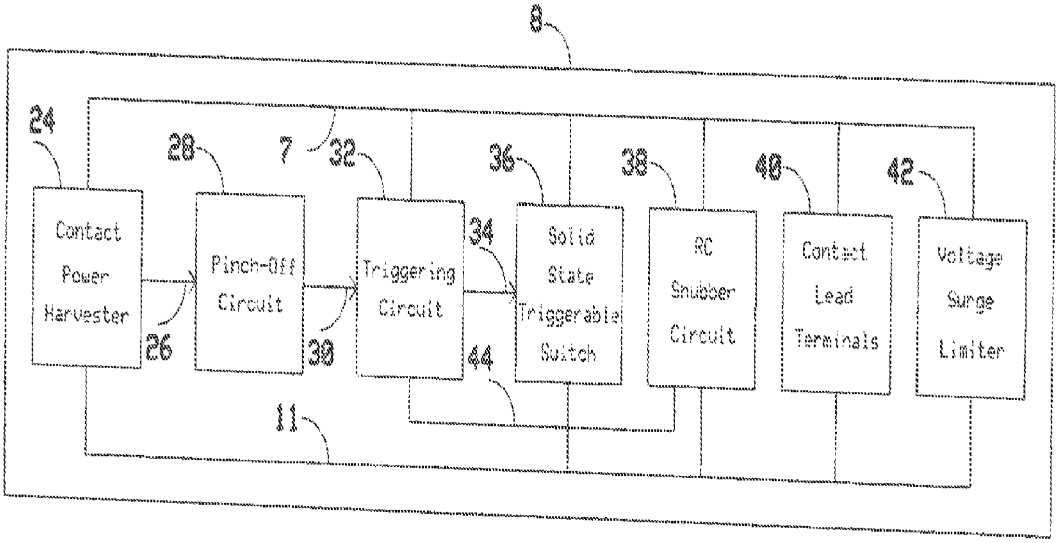
FIG. 2 illustrates generally an example of a two terminal arc suppressor block diagram.

FIG. 2 illustrates generally by means of a block diagram an example of a functional circuit of the two terminal arc suppressor 8. In this embodiment, the internal wiring bus 7 of the two terminal arc suppressor 8 is common and shared with a contact power harvester 24, a triggering circuit 32, a solid state triggerable switch 36, an RC snubber circuit 38, contact lead terminals 40 and a voltage surge limiter 42. The internal wiring bus 11 of the two terminal arc suppressor 8 is common and shared with the contact power harvester 24, the solid state triggerable switch 36, an RC snubber circuit 38, contact lead terminals 40 and a voltage surge limiter 42. The triggering circuit 32 connects to common resistor capacitor node of the RC snubber circuit 38 via a connection 44. The contact power harvester 24 connects via connection 26 to the pinch-off circuit 28. The pinch-off circuit 28 then connects, via connection 30, to the triggering circuit 32. The triggering circuit 32 connects, via connection 34, to the solid state triggerable switch 36.

Figure 3:
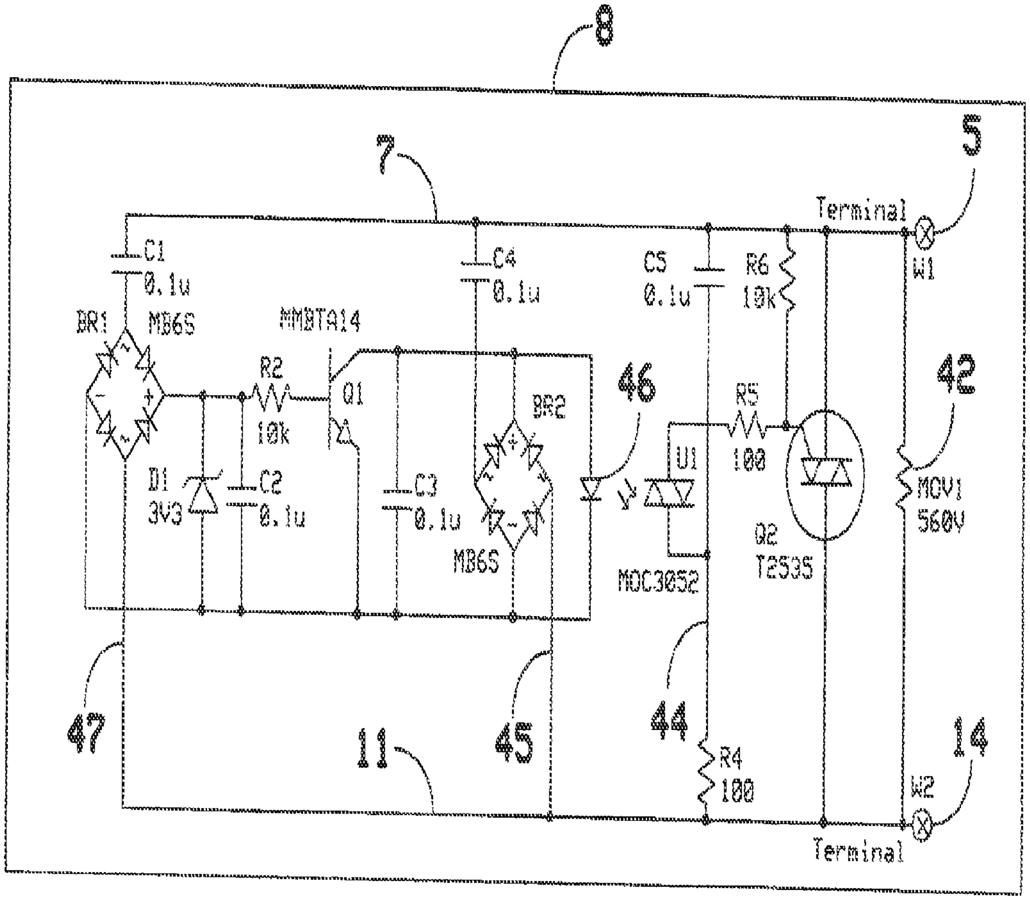
FIG. 3 illustrates generally an example of an AC two terminal arc suppressor schematic diagram.

FIG. 3 illustrates by a circuit schematic diagram an implement of an AC two terminal arc suppressor comprising an exemplary embodiment.

In FIG. 3, the voltage surge limiter 42 comprises a surge limiting element like a Metal Oxide Varistor (MOV) or Transient Voltage Suppressor (TVS) that is connected directly across the arc suppressor's input terminals 5 and 14 and in parallel with a triac Q2 which, along with resistors R5 and R6 that are connected in series between the internal bus wire 7 and a main terminal of the output of the IR detector section of an optoisolator triac U1 make up the solid state triggerable switch 36 shown in the block diagram of FIG. 2. A capacitor C5 and a resistor R4 constitute the RC snubber circuit 38 of FIG. 2 and the second main terminal of the output section of the optoisolator triac U1 is connected to the common terminal 44 between the capacitor C5 and the resistor R4.

The IR emitter diode 46 of the optoisolator triac U1 is connected across the DC output terminals of a full wave bridge rectifier BR2 and, marked +− in FIG. 3. The AC input terminals of the bridge rectifier are connected by a capacitor C4 and a conductor 45 between the internal buses 7 and 11. Thus, the triggering circuit 32 of FIG. 2 is made up of the IR emitter diode 46, the full wave bridge rectifier BR2, a capacitor C3 and an AC coupling capacitor C4.

The pinch-off circuit 28 of FIG. 2 comprises a NPN transistor Q1 whose collector and emitter terminals are connected across DC output terminals of the bridge rectifier BR2 and its base electrode is connected through a current limiting resistor R2 to a DC output terminal + of a further full wave bridge rectifier BR1. The transistor Q1 and the resistor R2 and capacitor C2 make up the pinch-off circuit 28 shown in the block diagram of FIG. 2.

The contact power harvester 24 of FIG. 2 is seen to comprise the AC coupling capacitor C1, the bridge rectifier BR1 and a conductor 47. So long as the contacts being protected are open, an AC voltage is applied to BR1 and a DC output is present to charge C2 to the point where Q1 becomes forward biased to turn off the optoisolator triac IR emitter diode 46 rendering Q2 non-conducting.

Figure 4:
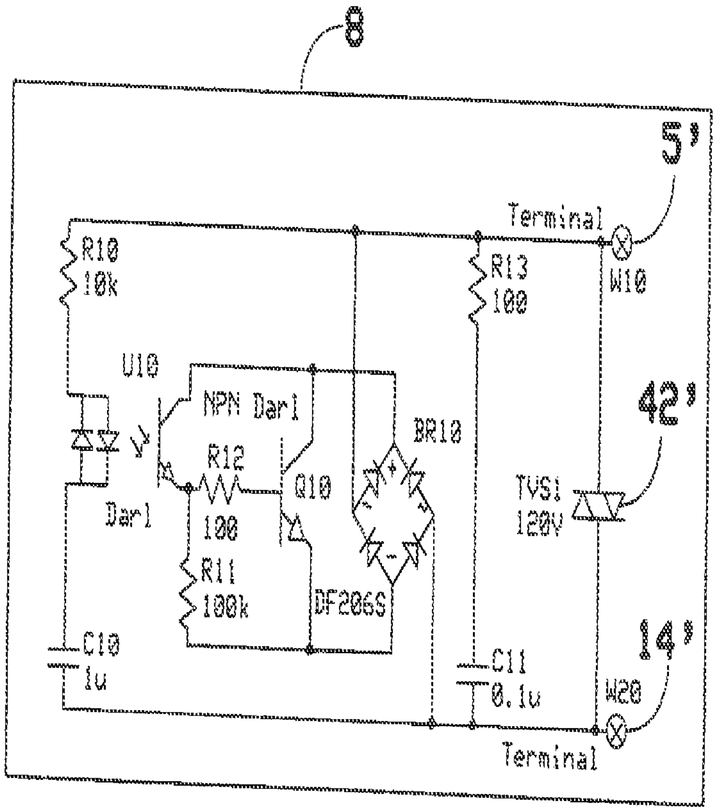
FIG. 4 illustrates generally an example of a DC two terminal arc suppressor schematic diagram.

FIG. 4 illustrates a circuit schematic diagram of an implementation of a two terminal arc suppressor for a DC power source comprising an exemplary embodiment. In FIG. 4, the voltage surge limiter 42 comprises a surge limiting element such as a metal oxide Varistor or Transient Voltage Suppressor that is connected directly across the arc suppressor's input terminals 5' and 14' and in circuit with a NPN transistor Q10 which, along with resistors R11 and R12, are connected to the output of the IR detector section of an AC Darlington optoisolator driver U10 and make up the solid state triggerable switch 36 shown in FIG. 2. A capacitor C11 and a resistor R13 constitute the RC snubber circuit 38 of FIG. 2.

The oppositely poled IR emitter diodes of the AC Darlington optoisolator U10 are connected across the DC power contact via current limiting resistor R10 and differentiating and timing capacitor C10. As soon as the DC current carrying contact that is connected to terminals 5' and 14' transition from the closed to the open state, current rushes through C10 limited by R10 and forward biased either of the IR emitter diodes of U10. The IR detector section of U10 conducts a base current for Q10 so that Q10 becomes saturated and temporarily conducts the load current through bridge rectifier BR10. BR10 provides for non polarized operation of the DC two terminal arc suppressor.

Figure 5:
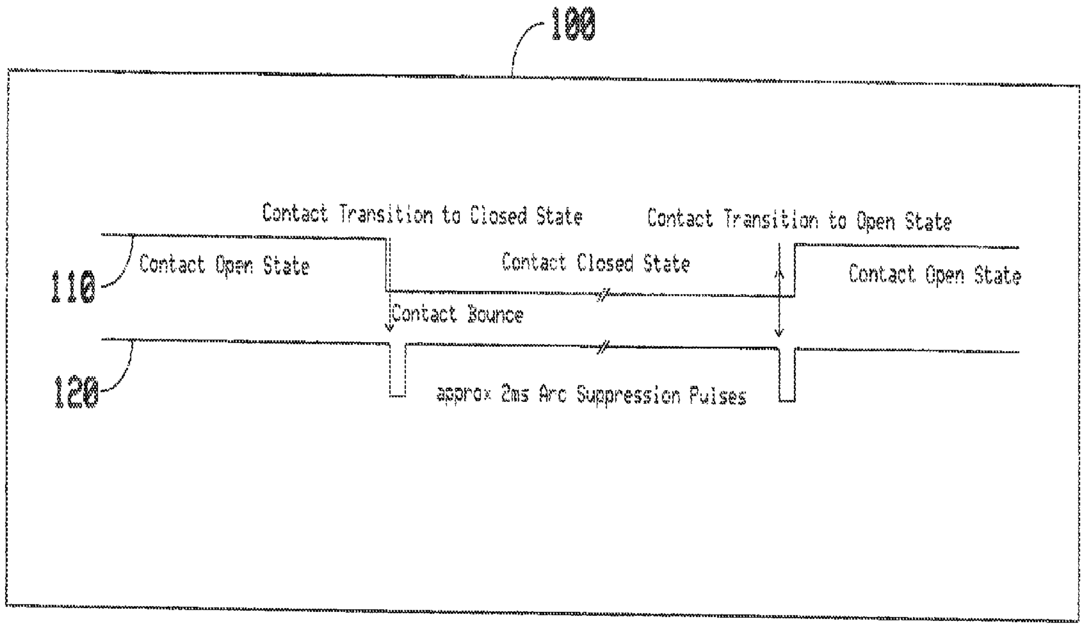
FIG. 5 illustrates generally an example of a two terminal arc suppressor timing diagram.

In the timing diagram of FIG. 5 the arc suppression pulse duration is set by the product of R10 and C10 at a value in a range from about 0.1 ms to 10 ms. As soon as the DC current carrying contact that is connected to terminals 5' and 14' transition from the open to the closed state, C10 is discharged via R10 and again forward biases either of the IR emitter diodes of U10. The IR detector section of U10 conducts a base current for Q10 so that Q10 becomes saturated and temporarily conducts the load current through full-wave bridge rectifier BR10.

Having described the constructional features of the preferred embodiments of the two terminal arc suppressor for both AC and DC power sources, consideration will next be given to their mode of operation and, in this regard, reference will be made to the timing diagram of FIG. 5.

Timing graph 110 depicts the status of the contact state starting at a contact open state, followed by a contact transition to closed state, followed by a contact closed state and followed by a contact transition to open state. Timing graph 120 depicts the status of the contact arc suppression pulse timing especially during the contact transition to closed state and the contact transition to open state. During the contact open state the contact power harvester 24 is able to harvest power from the AC terminals 3 and 12 of FIG. 1 because the switch, relay or contactor contacts are open and terminal 5 is not shorted to terminal 14. Thus, power is provided to the pinch-off circuit 28. This pinches off the power that activates the triggering circuit 32, thus preventing the triggering circuit 32 from triggering the solid state triggerable switch 36 from firing arc suppression pulses on wire terminals 5 and 14 via its internal connections 7 and 11.

During the contact closed state the contact power harvester 24 is shorted out and cannot harvest power as it could earlier from the open contact that is connected to terminals 5 and 14. As soon as the contact of the mechanical switch, relay or contactor 9 opens, an AC voltage is again present on the internal wiring connections 7 and 11 of the two terminal arc suppressor 8. As soon as voltage is available on the two internal wiring connections 7 and 11, the triggering circuit 32 receives AC current, via its AC coupling capacitor C4, wire connection 45, rectified by bridge rectifier BR2 and it is passed as a DC current through the IR emitter diode 46 of the input section of U1. As soon as current is flowing through the input section of U1, the output section of U1 in the triggering circuit 32 responds with placing the triac Q2 of the solid state triggerable switch 36 into the conduction state and, in effect, shorting out the connected contact of the mechanical switch, relay, or contactor 9 and taking over the current conduction for one half period of an AC power cycle.

At the same time, as the mechanical switch, relay or contactor 9 transitions to the open state, an AC voltage is available for the contact power harvester 24. As soon as AC voltage is available at the internal wire connections 7 and 11 of the two terminal arc suppressor, capacitor C1 and wire connection 47 of the contact power harvester circuit pass an AC current through bridge rectifier BR1. The rectified output of BR1 is available on its DC plus and minus terminals. A zener diode D1 limits the rectified DC voltage to a maximum voltage, in this example to 3.3V. As soon as DC voltage becomes available at the rectified output of BR1, capacitor C2 starts charging and making its charge voltage available to the base of Q1, via a current limiting resistor R2. The collector and emitter of Q1 connect to the input section of U1. U1 is already in the conducting state and, in return, firing power triac Q2 as soon as the contact made AC voltage available at terminals 5 and 14 through its action of transitioning from the closed to open state. A short time later, that is determined by the charging time constant of C2, the input voltage to U1 is pinched off by Q1 resulting in termination of the firing pulse, and resulting in holding of Q2 until the end of the current half cycle in that since the mechanical switch, relay or contactor contact is now in the open state.

Generally, when a mechanical switch, relay or contactor contact transitions from the open to closed state, the force at which the two contact points hit each other cause them to repel each other thus resulting in repeated opening and closing of the contacts again, and again, i.e., contact bounce. The two terminal arc suppressor of the present invention suppresses contact arcing during contact bounce conditions because a contact bounce consists of a series of contact transitions to the open state and the arc suppressor acts accordingly in the manner already described.

In addition, due to the optimal and short timing of the firing of the sold state triggerable switch the two terminal arc suppressor is also tolerant of contact chatter during which a mechanical switch, relay or contactor rapidly, successively, and continuously changes between the open and close states.

Figure 6:
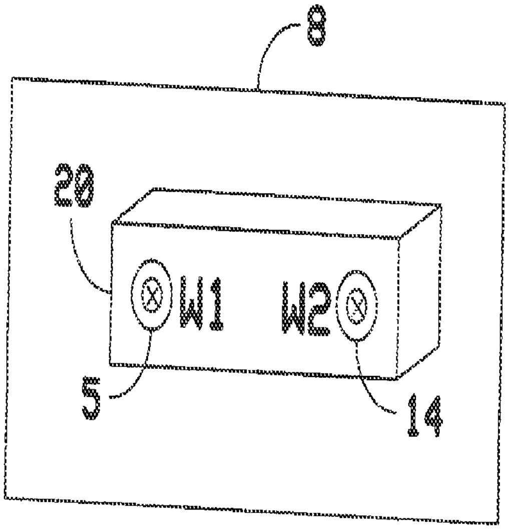
FIG. 6 illustrates generally an example of a circuit package, a two terminal arc suppressor of the present invention.

FIG. 6 illustrates generally an example of a two terminal arc suppressor 8 mechanical outline. The two terminal arc suppressor 8 is housed in housing 20. Wire terminals 5 and 14 protrude through housing 20 for electrical access and connection to the mechanical switch, relay or contactor single or multiphase contacts 9.

It can be seen, then, that the present invention provides a two terminal arc suppressor that is adaptable for use with AC and DC power sources in single or multiphase power systems and that does not require a neutral connection or any external power beyond that which is being switched by a switch, relay or contactor or other contacts are being protected. Having only two wires to contend with, the arc suppressor of the present invention can be quickly installed in that it does not require any additional or other connections to associated or auxiliary equipment. Those skilled in the art will appreciate that the circuits of FIGS. 3 and 4 can be fabricated using solid state, ceramic and thick film technologies only resulting in a device that is rugged and not subject to the failure due to excessive current loads or high operating temperatures.

In that the circuit is active only during contact transitions, the device undergoes minimal thermal stress on its internal components which is projected to lead to a Mean-Time-Between-Failures (MTBF) in excess of 20 years.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

The description of the various embodiments is merely exemplary in nature and, thus, variations that do not depart from the gist of the examples and detailed description herein are intended to be within the scope of the present disclosure.

Such variations are not to be regarded as a departure from the spirit and scope of the present disclosure.

The invention claimed is:

1. An AC arc suppressor, comprising:

(a) a pair of terminals adapted to be connected across a set of switchable contacts, the set of switchable contacts configured to couple an AC voltage source to a load;

(b) a solid state triggerable switch connected between the pair of terminals;

(c) a triggering circuit operatively coupled to the solid state triggerable switch operative upon the switchable contacts moving from a closed state to an open state for driving the solid state triggerable switch into a conductive state to short out the switchable contacts; and (d) a pinch-off circuit coupled to the triggering circuit for controlling the length of time that the solid state triggerable switch remains in said conductive state following movement of the switchable contacts from the closed state to the open state.

2. The arc suppressor of claim 1 and further including a voltage surge limiting component connected between the pair of terminals.

3. The arc suppressor of claim 2 wherein the component is a metal oxide varistor.

4. The arc suppressor of claim 2 wherein the component is a transient voltage suppressor.

5. The arc suppressor of claim 1 wherein the solid state triggerable switch comprises a full wave rectifier bridge having input terminals connected to said pair of terminals and a transistor switch connected across output terminals of the rectifier bridge.

6. The arc suppressor of claim 5 wherein said triggering circuit comprises an optoisolator having an input IR emitter source and output IR detectors, said input IR emitter source connected in series with a resistor and a connector between said pair of terminals and the IR detector connected to the transistor switch.

7. The arc suppressor of claim 1 wherein the solid state triggerable switch comprises a power triac having a first anode electrode connected to one of the pair of terminals, a second anode electrode connected to the other of the pair of terminals and a triggering electrode.

8. The arc suppressor of claim 7 wherein the triggering circuit comprises an optoisolator having an input IR emitter source and an output IR detector, said output IR detector being connected to said triggering electrode.

9. The arc suppressor of claim 8 wherein the triggering circuit further includes a full wave rectifier connected between said pair of terminals and having output terminals connected to the input IR emitter source of the optoisolator.

10. The arc suppressor of claim 8 wherein the pinch-off circuit comprises a transistor having a collector electrode connected to one terminal of the input IR emitter source, an emitter electrode connected to a second terminal of the input IR emitter source and a base electrode connected by an RC timing circuit to a contact power harvester circuit.

11. The arc suppressor of claim 10 wherein the contact power harvester circuit comprises a full-wave rectifier connected through a coupling capacitor to a first of the pair of terminals and connected through a current limiting resistor to a second of the pair of terminals, and DC output terminals of the full-wave rectifier connected to the RC timing circuit.

12. A solid state, two terminal AC arc suppressor comprising:

(a) a pair of terminals adapted to be connected across switchable contacts configured to couple an AC voltage source to a load;

(b) a contact power harvester circuit connected between the pair of terminals for producing a DC voltage upon the switchable contacts transitioning from a closed state to an open state;

(c) a power triac circuit having a first anode electrode connected to one of the pair of terminals, a second anode electrode connected to the other of the pair of terminals and a triggering electrode; and (d) circuit means connected to the contact power harvester circuit and the triggering electrode for driving the power triac circuit into a conducting state only for a predetermined time interval when the switchable contacts transition from an open state to a closed state and for again rendering the power triac circuit conducting for only a predetermined time interval when the switchable contacts transition from a closed state to an open state.

13. The arc suppressor of claim 12, wherein the circuit means comprises an optoisolator having an IR emitter source and an IR detector wherein the IR detector is connected in driving relation to the triggering electrode and the IR emitter source is connected to a source of DC current.

14. The arc suppressor of claim 13 wherein the source of DC current is a full-wave rectifier coupled to the pair of terminals.

15. The arc suppressor of claim 14 and further including a pinch-off circuit coupled to the IR emitter source for turning off the IR emitter source at a predetermined time following the transition of the switchable contacts from the open state to the closed state and from the closed state to the open state.

16. The arc suppressor of claim 15 wherein the pinch-off circuit includes a semiconductor switch connected across DC output terminals of the full-wave rectifier.

17. The arc suppressor of claim 16 and further including a RC timing circuit coupled to the semiconductor switch for turning on the semiconductor switch a predetermined time following said transitioning.

18. The arc suppressor of claim 17 wherein the predetermined time is within a range of from 0.1 ms to 10 ms.

19. A solid state, two terminal AC arc suppressor comprising:

(a) a first pair of input terminals adapted to be connected in parallel relation to a set of switchable contacts configured to couple an AC voltage source to a load, (b) a surge suppressor component connected between the first pair of input terminals;

(c) a snubber circuit comprising a resistor and a capacitor connected in series between the first pair of input terminals;

(d) a triggerable solid state switching device connected between the first pair of input terminals; and (e) a triggering circuit for driving the triggerable solid-state switch into a conducting state for a predetermined time interval upon the making or the breaking of the set of switchable contacts.

20. The arc suppressor of claim 19, wherein the triggerable solid state switching device comprises a full-wave rectifier bridge having a second pair of input terminals connected individually to the first pair of input terminals and a pair of output terminals with a transistor switch having a collector to emitter path connected to the pair of output terminals; and said triggering circuit including an optoisolator having an IR emitter source connected in series with a resistor and a capacitor between the first pair of input terminals and an IR detector connected in driving relation to a base electrode of the transistor switch.

* * * * *